May 2, 1950 J. POLARD 2,506,173
MACHINE FOR INSERTING COILS IN ELECTRIC STATORS
Filed Nov. 4, 1948 2 Sheets-Sheet 1

Inventor
Jean Polard
By Haseltine, Lake & Co.
Agents

May 2, 1950 J. POLARD 2,506,173
MACHINE FOR INSERTING COILS IN ELECTRIC STATORS
Filed Nov. 4, 1948 2 Sheets-Sheet 2

Inventor
Jean Polard
By Haseltine, Lake & Co.
Agents

Patented May 2, 1950

2,506,173

UNITED STATES PATENT OFFICE 2,506,173

MACHINE FOR INSERTING COILS IN ELECTRIC STATORS

Jean Polard, St.-Germain-en-Laye, France, assignor to Societe Anonyme dite: Compagnie Electro-Mecanique, Paris, France Application November 4, 1948, Serial No. 58,238
In France November 7, 1947

7 Claims. (Cl. 29—205)

The bedding of the coils in the magnetic circuits of electric machines more and more becomes the most important part of the time required in the manufacture of such machines; when the operation is effected by hand, time can only be saved at the cost of a poor utilisation of the material. Besides, the uniformity and dimensions of the winding depend essentially upon the skill of the labour by which the work is performed, which makes it necessary, in large-scale manufacture where uniformity of the product is an essential requirement, to allow comparatively large tolerances hardly consistent with the obtainment of high-quality products.

The present invention has for its object a winding machine for electric machine stators, by means of which the winding can be bedded without any direct intervention of the workman, while in the course of the bedding operation the said winding can be given accurate dimensions as well as a well defined position with respect to the magnetic circuit.

In order that the invention may be understood more easily, a particular embodiment of such a machine will be described by way of the example hereinafter, in which it is referred to the appended drawings.

Figure 1:
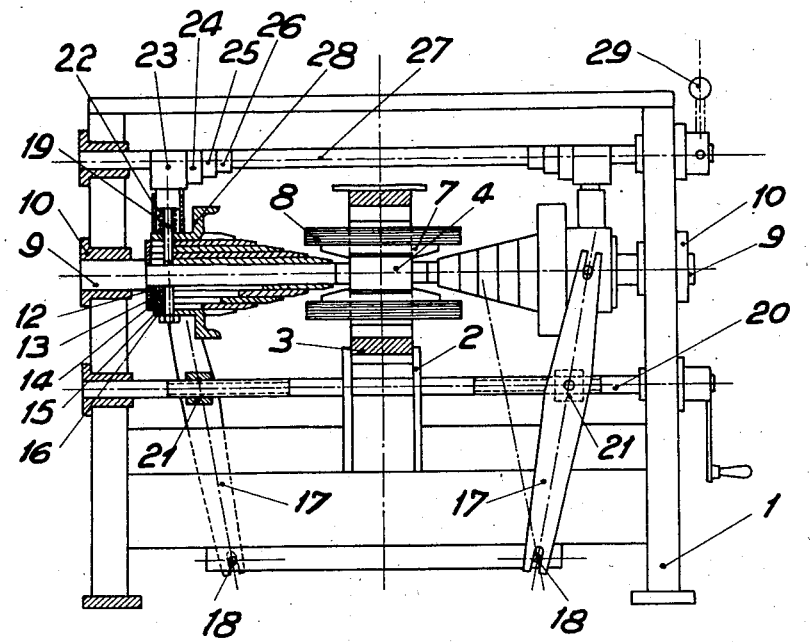
Figure 1 is a view of the whole machine, the two symmetrical halves of which are respectively illustrated theoric in vertical sectional and the other in elevational view.

The different parts of the winding machine are carried by a metal frame 1 that comprises a cradle 2. The stator 3, ready for the winding operation, is secured on said cradle at the orifices of the terminals, which is by no means limitative of the type of motor of which the said stator is designed, e. g. a legged motor, a round frame motor, and so on.

An iron false rotor 4 is inserted into the stator the slots 5 of which are equal in number and width to those in the stator.

A centering stud 6 provides for coincidence of the median planes of the slots respectively in the false rotor and the stator. The air gap is limited to the minimum value consistent with an easy insertion of the false rotor into the stator.

Figure 2:
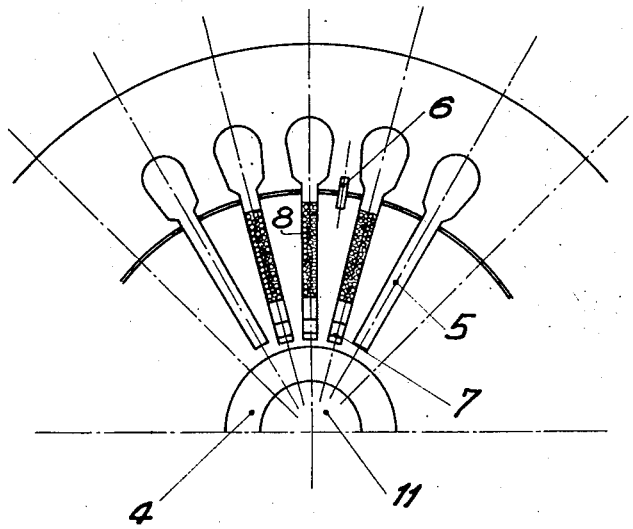
Figures 2, 3 and 4 are enlarged views of details of the same machine.

Arranged in the slots of the false rotor are wedges 7, with on either end of the stator iron an outer edge, of which the side turned towards the axis of the rotor is sloped for the purpose to be explained later on (see Figs. 2 and 3). Said wedges are freely slidable in the radial direction towards and away from the stator.

The winding 8 to be inserted into the stator is laid on said wedges. This previous operation may be carried out either by hand or automatically with the aid of a suitable machine. In fact, whatever the method of winding the false rotor may be, said coil is so designed that once inserted into the stator its dimensions will correspond exactly to the final dimensions. The false rotor is held in position sidewise by a pair of shafts 9 slidably mounted in bearings 10 centered on the shaft ends 11 of the false rotor (see Figs. 3 and 4).

Nested in one another on either shaft 9 are cylinders 12, 13, 14, 15, 16 with frusto-conical ends and slidably fitted on, yet retained from peripheral displacement, with respect to one another, either innermost cylinder 12 being likewise capable of longitudinal displacement on the related shaft 9.

The cylinders 12 to 16 are moved symmetrically in the axial direction by a pair of twin levers 17 pivoted respectively on a pin 18 rigid with the frame; they act upon the outermost cylinders 16 at either side of the axis of the latter by means of a fork visible in Fig. 1. The motion of cylinder 16 is transmitted to the other cylinders 12, 13, 14, 15 by means of a dog 19 which in the position shown in Fig. 1 is adapted to drive all the cylinders pertaining to one set simultaneously towards the rotor.

The two sets of cylinders located each at one side of the rotor are moved endwise simultaneously and equally by means of a right-and-left worm spindle 20, either threaded part of which cooperates with a corresponding nut 21 rigid with the related twin levers. The spindle 20 is rotated either by hand (with the aid of a crank as shown in Fig. 1) or with the aid of an electric motor or of any suitable reversible gear.

The dog 19 by which all the cylinders pertaining to one set are made rigid with one another is loaded with a spring 22 by which it is urged towards the outside; however, it is retained in position by means of a set of stepped cams 23, 24, 25, 26 keyed or directly machined on a shaft 27 in such manner that they have with this shaft a common tangent plane on the side which is diametrically opposite to their point of maximum radius.

The winding machine operates as follows:

With the false rotor in position within the stator and locked by the shafts 9, the spindle 20 is set into rotation, with the result that the two sets of cylinders are slipped as a whole towards the false rotor. In the course of such an axial movement the cylinders 12 come into engagement in wedge like manner with the sloping inside edges of the wedges 7, whereby the latter are driven away radially. Consequently, that portion of the coil which is located within the iron of the false rotor is driven towards the outside, and since its only way out is the slot in the stator it will engage thereinto. At the same time, on the one hand the cylinders come into engagement with these portions of the coil which are located outside the iron and compel the said portions to partake of the movement of that portion of the coil which is already engaged, while on the other hand the dogs 19 are shifted axially across the large-diameter cam 23 on shaft 27.

The axial dimension of said cams 23 is so chosen that, as the cylinders 12 come into engagement with the false rotor, the dogs 19 clear the cam 23 and are snapped by the springs 22 into engagement with the cams 24. The extent of this displacement is such that the dogs 19 are clear of cylinders 12, yet remain in engagement with the other cylinders 13, 14, 15, 16.

By the time the cylinders 12 escape the action of the dogs 19 the cylinders 13 have assumed a position, with respect to the wedges 7, which corresponds to the position previously occupied by the cylinders 12 with respect to the said wedges at the beginning of the working process. The cylinders 14 thence perform the same function as cylinders 13 previously did. The operations goes on in this manner with the successive actions of the stopped cylinders upon the portions of the coil which are located within and without the iron of the false rotor, the said cylinders being cleared one after the other, at the time they come into engagement with the false rotor, by the axial displacement of the dogs 19 along the stopped cams until the coil is bedded completely in the stator slots due, to the action of the wedges 7.

Figure 3:
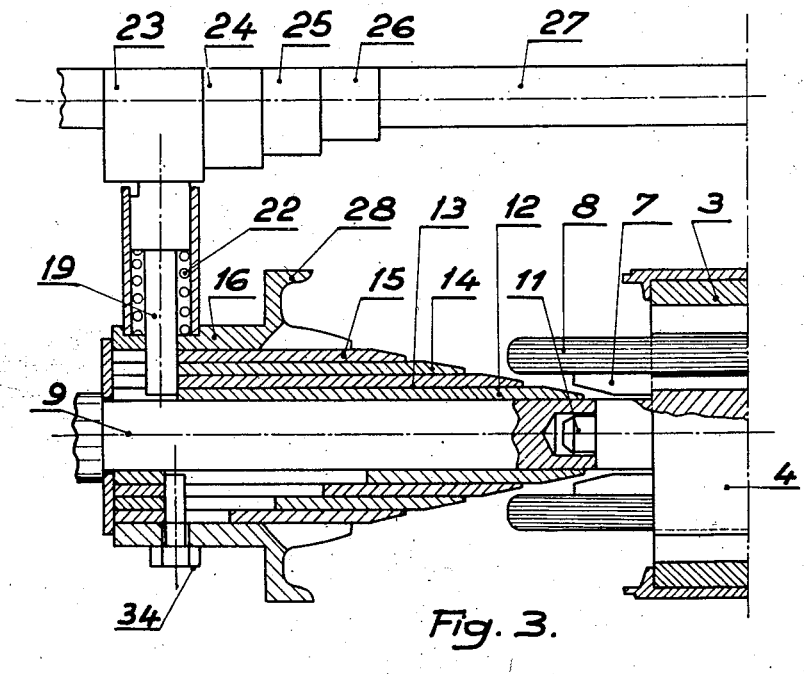
Figure 4:
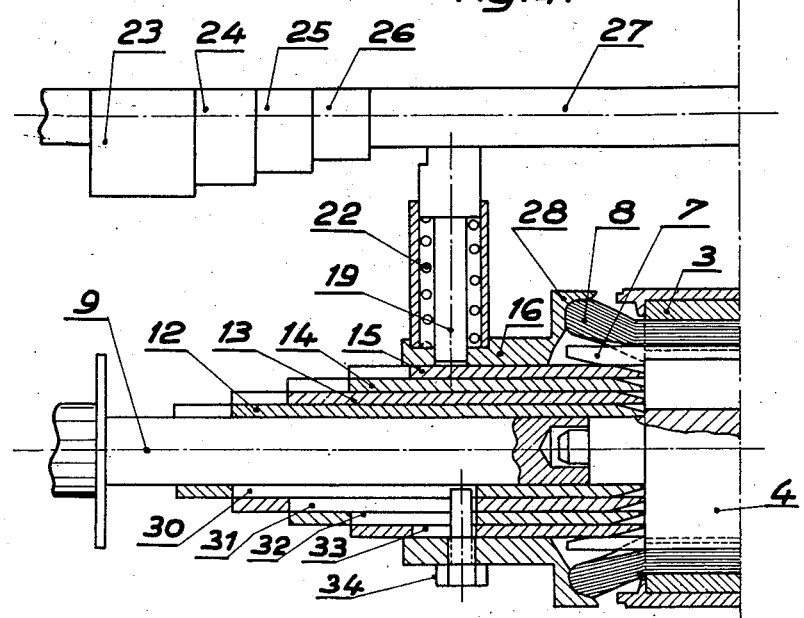

As shown in Figs. 1, 3, 4, the cylinders 16, which come last into action, are formed with a projection 28 of special shape whereby the coil heads of the stator winding are given the desired geometrical shape at the end of the operation, the whole coil being centered axially with respect to the wound up magnetic circuit, due to the provision of such a cylinder at either side of the stator, and at the same time those portions of the coil which stand out of the iron being accurately defined in their outline both axially and radially.

As a result of a continuous rotation of the spindle 20 and by the action of the various parts of the winding machine according to the invention the coil is thus shifted as a whole from the false rotor into the stator and centered with respect to the magnetic circuit, at the same time as the coil heads are given accurately dimensioned geometrical shapes. Figs. 3 and 4 respectively show the cylinders in their positions at the beginning and the end of the operation.

After the operation is completed the cylinders are brought back to their original positions by rotating the worm spindle 20 in the reverse direction; in order to make this shifting possible, i. e. that the cams 23 to 26 cannot hinder it, the shaft 27 is previously rotated through an angle of 180°; since the said cams, as already stated and as shown in Figs. 1, 3 and 4, are all tangent to the shaft on a generatrix of the latter diametrically opposite to their points of maximum radius, the way for the cylinders 12 to 16 is thus completely cleared and the said cylinders can be moved back to their original positions.

A weight 29 retains said shaft 27 in one of the two positions contemplated; however, such an arrangement is by no means limitative and the movement of the shaft 27 may be made dependent on that of the worm spindle 20 by means of a transmission mechanism adapted to lock the said shaft during the intervals between two successive changes in the direction of the motion of the worm spindle.

Due to the cooperation of the nuts 21 with the levers 17 and the worm spindle 20, the rotating of the latter in the reverse direction results in the backwards movement of the frusto-conical cylinder 16 and successively of the cylinders 15, 14, 13, 12 which are driven each in its turn, by means of a bolt 34 screwed in cylinder 16, in diametrical opposition to the dog 19 and slidable in slots 30, 31, 32, 33 milled in the respective cylinders. The said bolt 34 is shown in Figs. 4 and 3 respectively in its starting and its end position in the course of the said return movement.

In order to make the machine ready for a new winding operation the dogs 19 have to be set again into engagement with all the cylinders, which result is obtained easily by rotating the shaft 27 once again through an angle of 180°, whereby the springs 22 are stressed and the machine is restored to its original position.

The winding machine according to the invention is subject to no limitation as to the character of the coil, the number of phases, the number of poles, the number and shape of the slots in the stator to be wound. More particularly, the winding may comprise coils either located in different planes or exactly like. It may also be contemplated to perform the bedding operation with the aid of this machine one coil or coil group after the other (e. g. by groups of 2, 3, 4 or more coils) instead of all at once as described hereinbefore. Whether a single-step or a multi-step bedding operation is resorted to depends upon the nature of coil on the false rotor.

What I claim as my invention and desire to secure by Letters Patent is:

1. A machine adapted to shift coils in a single or several operations from slots in the periphery of a false rotor into the related slots of a stator surrounding said false rotor, comprising a frame, a false rotor, means to secure the pre-wound false rotor and the stator on said frame with the slots in the rotor opposite with those in the stator and the said coils projecting outside the false rotor at either side thereof, wedges associated with said coils, two sets of hollow cylinders coaxial with the false rotor arranged at either side of the latter slidably nested in one another, having frusto-conical skirts at their ends next to said false rotor and adapted to drive said wedges and associated coils arranged in the rotor slots of the false rotor radially towards the stator as the said cylinders are moved axially towards said false rotor, and means to displace said cylinders successively, beginning with the pair smallest in diameter, the outermost cylinders having a diameter sufficiently large to complete the engagement of the coils into the slots of the stator.

2. A machine according to claim 1 wherein a pair of coaxial shafts are mounted in the opposite sides of the frame in such manner that their inner ends respectively lock the outer ends of the false rotor and center the latter within the stator.

3. A machine according to claim 1, wherein the cylinders in each set are shifted successively by means of a dog received in longitudinal slots in the cylinders, and comprising a sleeve slidably mounted on the outermost cylinder, means on said sleeve to guide said dog radially and resiliently urge it towards the outside, means to move said sleeve axially, and a set of stepped cams to be engaged successively by the said dog as the sleeve is shifted, the steps provided by said cams being such that the dog pressed into engagement therewith successively clears the slots in the cylinders in proportion as said dog is shifted towards the false rotor, the said cams meanwhile remaining stationary.

4. A machine according to claim 1 wherein the outermost cylinder in each set is designed to engage the corresponding heads of the coils engaged in the stator and to bend them to the desired final shape.

5. A machine according to claim 1 wherein the outermost cylinder is provided with a bolt freely engaged in slots managed in the difference cylinders, said slots being close at both ends and being of unequal lengths in such manner that, as the said outermost cylinder is driven towards the false rotor, said bolt can move freely in the slots, but, as the said cylinder is moved backwards, the said other cylinders will be caused to partake of the outermost cylinder displacement successively, beginning with the one next to said outermost cylinder.

6. A machine according to claim 3 wherein the cam sets are mounted in the frame in such manner that they can be rotated through an angle of 180° about an axis parallel with that of the cylinders, in which position they will provide straight guide generatrices for the dogs pressed there against, whereby the said dogs can move freely parallel with said axes, and means to rotate said cam sets so that the dogs are pushed back towards the axis of the cylinders through the slots therein.

7. A machine according to claim 3 wherein the two dogs are moved towards the false rotor and in the opposite direction by means of a pair of levers pivoted on the frame and on the other hand to the outermost cylinders in which the said dogs are slidably mounted, and means to move said levers simultaneously in opposite directions as desired.

JEAN POLARD.

No references cited.